Figure 4:
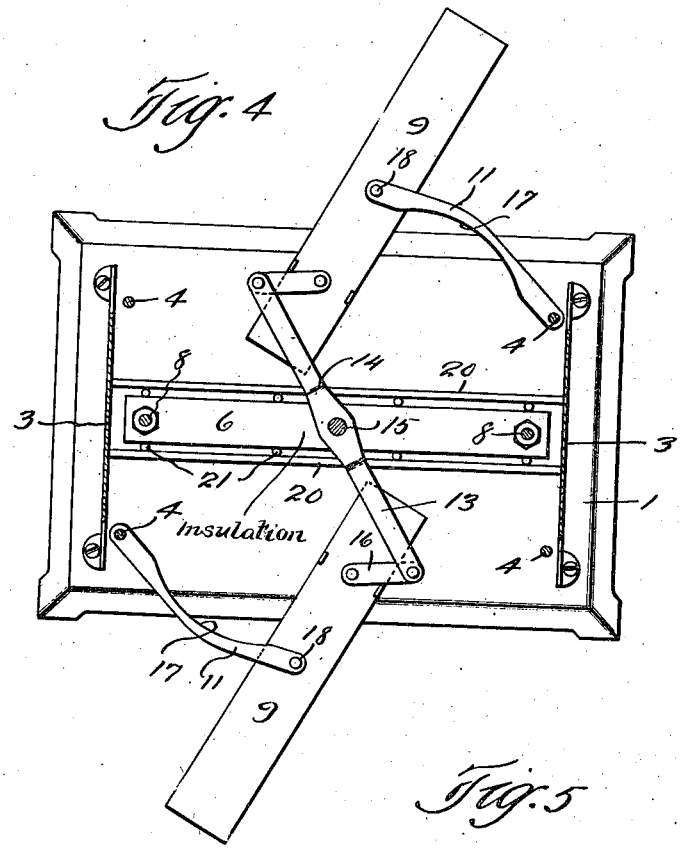
Figure 5:
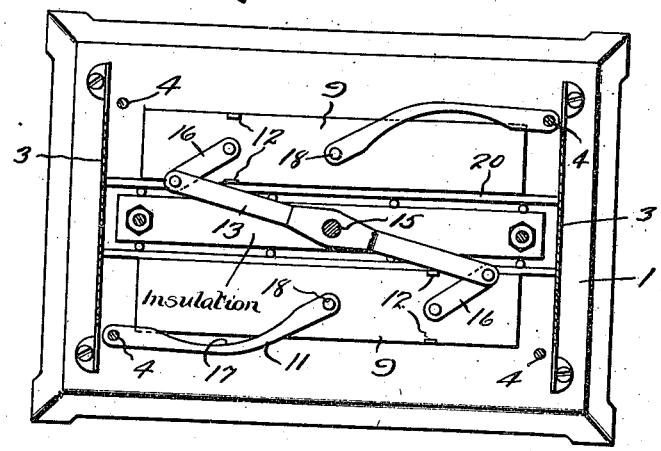

May 8, 1923.
H. KRUESHELD
ELECTRIC TOASTER
Filed March 20, 1922
1,454,056
3 Sheets-Sheet 1
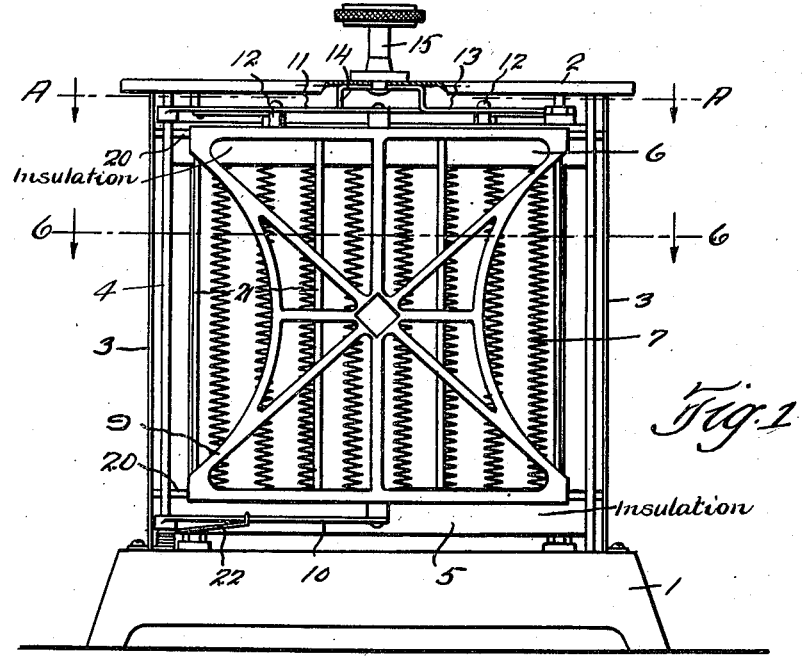

May 8, 1923.
H. KRUESHELD
ELECTRIC TOASTER
Filed March 20, 1922
1,454,056
3 Sheets-Sheet 2
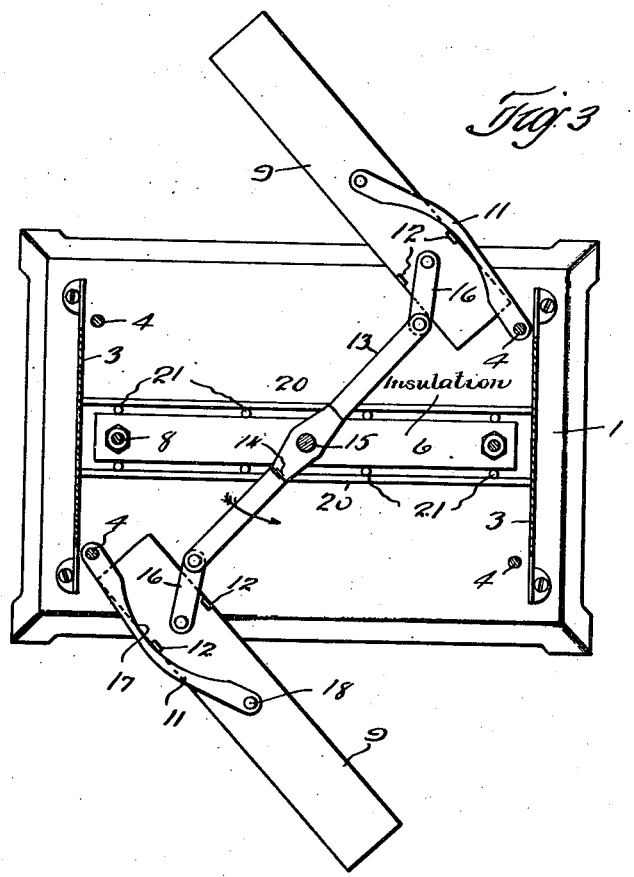
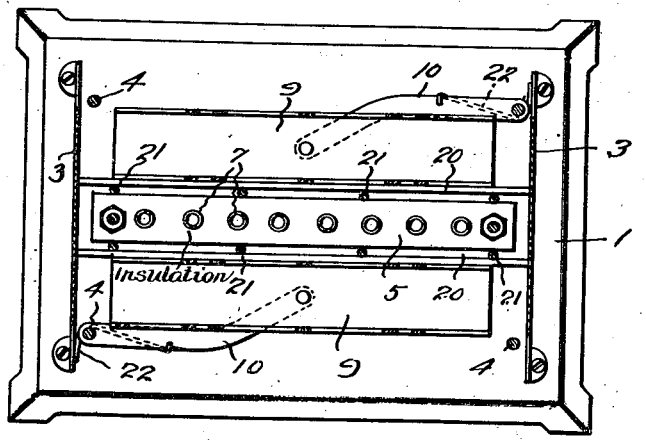
Inventor
Henry Kruesheld
By John A. Bornhardt
Atty.

May 8, 1923.

H. KRUESHELD

ELECTRIC TOASTER

Filed March 20, 1922    3 Sheets-Sheet 3

1,454,056

Inventor
Henry Kruesheld
By John A. Bommhardt
Atty.

Patented May 8, 1923.

1,454,056

UNITED STATES PATENT OFFICE.

HENRY KRUESHELD, OF NEW WASHINGTON, OHIO, ASSIGNOR TO THE PERFECTION ELECTRIC PRODUCTS CO., OF NEW WASHINGTON, OHIO, A CORPORATION OF OHIO.

ELECTRIC TOASTER.

Application filed March 20, 1922. Serial No. 545,277.

*To all whom it may concern:*

Be it known that I, HENRY KRUESHELD, a citizen of the United States, residing at New Washington, in the county of Crawford and State of Ohio, have invented certain new and useful Improvements in Electric Toasters, of which the following is a specification.

This invention relates to an improvement in electric toasters and has for its principal object to provide an improved device of this character in which the sides of the bread are alternately turned to the heating element. Other objects are to provide a device of this character which is cheap to manufacture and which is simple and durable in operation.

In the drawings Fig. 1 is a side elevation of my device; Figs. 2, 3, 4 and 5 are sections on the line A—A of Fig. 1 showing the bread holders in different positions and Fig. 6 is a section on the line 6—6 of Fig. 1.

Referring to the drawings by reference numerals, 1 indicates a base and 2 a top member which is spaced from the base 1 by end plates 3 and vertical posts 4. 5 and 6 indicate insulating members, one at the top and one at the bottom, between which the heating elements 7 are supported, said insulating members being carried on posts 8 which extend between the base 1 and the top 2. 9 indicates a pair of bread holders which are pivoted to arms 10 at the bottom and 11 at the top, said arms being pivotally mounted on diagonally opposite posts 4 as shown in Figs. 2, 3, 4 and 5. Near one end of each of the bread holders 9 are lugs 12 which project upwardly from the top of the bread holders. A cross bar or lever 13, bent upwardly at the middle as at 14, is rigidly connected to a post 15 which is rotatably mounted in the top 2. Links 16 have one end pivoted to the top of the bread holders 9 and the other end pivotally connected to the ends of the bar 13.

Fig. 2 shows the bread holders 9 in their normal position exposing one side of the bread to the heating element. When that side has been sufficiently toasted the other side is turned to the heating element by rotating the post 15. The parts will first take the position shown in Fig. 3; then the position shown in Fig. 4 and next the position shown in Fig. 5. When the bread is placed in the holders 9 they are brought to the position shown in Fig. 3 and then the bread can be slipped in the ends thereof.

The upper arms 11 are cut out as at 17 to clear the lugs 12.

As the post 15 and the cross piece 13 are rotated in the direction indicated by the arrow in Fig. 3 the holders 9 are swung about their pivot points until the lugs 12 come into engagement with the arms 11 and then upon further rotation of the arm 13 the arms 10 and 11 are swung about their pivots until the link 16 comes into engagement with the other lug 12 which will rotate the holders about their pivot points 18 and bring the parts into the position shown in Fig. 4. Further rotation will then bring the parts into the position shown in Fig. 5. In order to turn it back from the position shown in Fig. 5 to the position shown in Fig. 2 the post 15 is rotated in the opposite direction.

A frame consisting of horizontal bars 20 and vertical bars 21 is placed on each side of the heating elements 7 and the bread holders 9 are normally held against this frame by the pressure of springs 22 which act on the members 10.

It will therefore be seen that the first movement accomplished by turning the button 15 is to swing the bread holders and the arms 10 and 11 outwardly on the pivots of said arms and then continued turn causes the links 16 to strike the lugs 12 and reverse the bread holders on their pivots 18, and further turn then causes the bread holders and the arms 10 and 11 to swing inwardly to bring the reversed bread holders against the frames at the opposite sides of the heating element. A very quick action is thus effected, and the bread does not have to be handled in toasting both sides thereof. The holders 9 are skeleton frames which expose the bread at both sides thereof to the heating element.

I claim:

1. An electric toaster comprising a supporting frame, a heating element standing therein, a pair of bread holders, swinging arms pivoted to the frame and to the holders, and an operating lever pivoted on the frame and having a pivoted link connection at each end with the bread holders respectively, and adapted to swing the arms and reverse the bread holders substantially as described.

2. An electric toaster comprising a stand having a heating element standing thereon, a pair of arms pivoted on the stand at diagonally opposite corners, a bread holder pivoted between the arms of each pair, and a lever pivoted at its middle to the stand and flexibly connected at its opposite ends to the bread holder and adapted to reverse the same substantially as described.

3. An electric toaster comprising a stand provided with an upright heating element thereon, a swinging arm pivoted to the stand and diagonally opposite sides of the heating element, a reversible bread holder pivotally supported by each arm, and an operating lever pivoted at its middle to the stand and having a link connection at each end to the corresponding bread holder.

4. An electric toaster comprising a stand provided with an upright heating element thereon, a swinging arm pivoted to the stand and diagonally opposite sides of the heating element, a reversible bread holder pivotally supported by each arm, and an operating lever pivoted at its middle to the stand and having a link connection at each end to the corresponding bread holder, each bread holder having a pair of projecting studs adapted to be struck by the link to reverse the bread holder when the lever is turned.

5. An electric toaster comprising a stand provided with an upright heating element, a pair of upper and lower arms pivoted at diagonally opposite sides of the heating element, a reversible bread holder pivoted at top and bottom between the arms of each pair, the upper end of the bread holder having projecting lugs at opposite sides, a lever pivotally mounted above the heating element, links connecting opposite ends of the lever to the respective bread holders, said links being arranged to strike said lugs when the lever is turned, and means at the top of the stand to turn the lever.

6. An electric toaster comprising a stand provided with an upright heating element, a pair of upper and lower arms pivoted at diagonally opposite sides of the heating element, a reversible bread holder pivoted at top and bottom between the arms of each pair, the upper end of the bread holder having projecting lugs at opposite sides, a lever pivotally mounted above the heating element, links connecting opposite ends of the lever to the respective bread holders, said links being arranged to strike said lugs when the lever is turned, and means at the top of the stand to turn the lever, said means comprising a button mounted in the top of the stand and connected to said lever.

7. An electric toaster comprising a stand provided with a heating element, a reversible bread holder rotatably mounted at each side of the heating element, and means connected to both of said bread holders to simultaneously reverse the same to present opposite sides thereof to the heating element.

8. An electric toaster comprising a stand provided with an upright heating element exposed at opposite sides thereof, a reversible bread holder pivotally and swingingly supported on the stand at opposite sides of the heating element, and means connected to both of said bread holders to simultaneously swing and turn the same to reverse position with respect to the heating element.

9. An electric toaster comprising a stand, an upright heating element thereon effective from opposite sides, a pair of bread holders movably mounted on said stand at opposite sides of said heating element and each having two surfaces adapted for exposure to said heating element, and means for reversing all of said bread holders with respect to said heating element to successively present the opposite surfaces thereof to said heating element.

10. An electric toaster comprising a heating element, a bread holder having two surfaces adapted for exposure to said heating element, and means for swinging said bread holder toward and away from said heating element and for reversing it with respect to said heating element during its swinging movements to successively present the opposite surfaces of said bread holder to said heating element.

In testimony whereof, I affix my signature in presence of two witnesses.

HENRY KRUESHELD.

Witnesses:
R. C. ALT,
F. H. SPILLETTE.